United States Patent [19]

MacLennan et al.

[11] 4,354,234
[45] Oct. 12, 1982

[54] AUTOMATIC LOCK-POSITIONING OF FOLDABLE HELICOPTER BLADES

[75] Inventors: Roderick A. MacLennan, Stratford; William J. Mulvey, North Haven, both of Conn.

[73] Assignee: United Technologies Corporation, Hartford, Conn.

[21] Appl. No.: 195,808

[22] Filed: Oct. 10, 1980

[51] Int. Cl.³ .................. G06F 15/20; B64C 27/50
[52] U.S. Cl. .......................... 364/424; 244/17.13; 416/143
[58] Field of Search ............. 364/424; 244/17.13, 244/17.17; 416/134 A, 142, 143

[56] References Cited

U.S. PATENT DOCUMENTS

| | | | |
|---|---|---|---|
| 3,698,662 | 10/1972 | Rostad | 416/143 X |
| 3,765,794 | 10/1973 | Kudasch et al. | 416/143 |
| 3,874,817 | 4/1975 | Ferris | 416/143 |
| 4,252,504 | 2/1981 | Covington et al. | 416/143 |
| 4,268,222 | 5/1981 | Bernard | 416/143 X |

Primary Examiner—Jerry Smith
Attorney, Agent, or Firm—M. P. Williams

[57] ABSTRACT

The foldable rotor blades (12) of a helicopter are automatically adjusted to pitch angles where they can be locked as a prerequisite to folding by commands generated (98, 112) to cause trim actuators (39-41) to drive swash plate servos (17-19) to the correct positions, initially (98) in response to stored trim references (120) and eventually (112) in response to the difference (109) between stored swash plate servo positions (120) and current servo positions (20-22).

3 Claims, 5 Drawing Figures

AUTOMATIC LOCK-POSITIONING OF FOLDABLE HELICOPTER BLADES

The Government has rights in this invention pursuant to Contract No. N00019-77-C-0202 awarded by the Department of the Navy.

TECHNICAL FIELD

This invention relates to positioning, or adjusting the pitch angle of foldable helicopter blades prior to locking the blades in their pitch axis to enable folding the blades near the helicopter fuselage during nonuse of the helicopter, and more particularly to automatically positioning the pitch of the main rotor blades to enable them to be locked in position prior to folding.

BACKGROUND ART

In certain helicopters used for specific applications, such as helicopters based on seagoing ships, it has long been known to fold the main rotor blades to positions adjacent the fuselage of the helicopter during nonuse of the helicopter. This facilitates storage of each helicopter in a relatively small space as well as rendering helicopters which are stored in the open less vulnerable to wind gusts and the like during storage.

In order to fold the blades, it is necessary that each blade assume a predetermined position with respect to the blade fold hinge, and with respect to the fuselage of the aircraft. Therefore, before folding blades, the main rotor is indexed to a predetermined position which puts all of the blades on the rotor in a position where each may be folded to a position alongside the fuselage. Thereafter, the pitch angle of each of the blades is adjusted to a desired position and the pitch angle is locked by means of pins, so that the pitch angle of the blades will not thereafter vary as the blades are being folded.

As is known, the pitch of the main rotor blades of a helicopter is adjusted by push rods which are urged against, and therefore raised and lowered by a swash plate which can tilt varying amounts in any azimuthal direction. It is the tilting of the swash plate which causes the blades to achieve the nominal collective pitch with the desired varying cyclic pitch superposed thereon. As the blades rotate about the main rotor in flight, the push rods connected to the blades and rolling on the swash plate assume various positions in dependence on the tilt of the swash plate and the azimuthal position of the rotor. Thus it is blade motion as the blades rotate which actually achieves the variation pitch in dependence upon the then-current position of the swash plate. Therefore, adjusting the pitch of the rotor blades prior to folding requires positioning of the swash plate, in a fashion similar to that achieved by the pilot controls and/or automatic flight control system during flight.

In the earliest systems, the pitch lock pins were generally displaced by hydraulic pressure, and the pitch positions of the blades were slewed back and forth by operation of manual controls (such as the cyclic pitch stick and the collective pitch stick) until each blade has passed by the pitch lock. The pin was able to snap into place and thereby prevent further pitch change of the blade. However, on-the-fly snap-in of locking pins results in excessive wear. Furthermore, hydraulically actuated lock pins are cumbersome and impede the ability to properly design a rotor head for a helicopter. Electric motor actuated pins, on the other hand, are well suited to rotor head design, but require that the pins be given a sufficient time to engage the blades while they are held in the proper position. This would have required the use of pilot indicators to show the pilot correct blade pitch positions for pin engagement, the pilot moving the controls very slowly to achieve indications and to provide minute adjustment in pitch position once the indicators are lit until pin engagement was achieved. A motorized blade fold lock of a modern type is disclosed in a commonly owned, copending U.S. patent application of Ferris entitled BLADE FOLD RESTRAINT SYSTEM, Ser. No. 35,364, filed on May 2, 1979 and now U.S. Pat. No. 4,284,387.

DISCLOSURE OF INVENTION

Objects of the invention include automatic positioning of helicopter blade pitch angle to facilitate folding of the blades.

According to the present invention, an automatic flight control system of a helicopter provides commands to the pitch, roll and collective pitch trim actuators to thereby position the pitch angle of the main rotor blades for locking, prior to folding the blades. In further accord with the present invention, the pitch, roll and collective trim commands are provided in response to stored pitch, roll and collective trim reference values which were determined to be correct in a prior blade folding operation, and further in response to reference values of swash plate servo positions which were determined to be correct in a prior blade folding operation. In still further accord with the present invention, the swash plate servo positions stored from a previous blade folding operation are utilized as the desired goal for positioning in response to the pitch, roll and collective trim commands stored from the previous blade folding operation, and the pitch, roll and collective trim commands are updated, by using an inverse mixer matrix, if necessary in order to achieve positioning of the swash plate as indicated by the swash plate servo positions stored in a previous blade folding operation.

The present invention avoids the necessity for the pilot to continuously move the collective stick and the cyclic stick while awaiting pins to randomly fall into locks, which causes excessive wear. The invention overcomes the need for the pilot to hold the collective and cyclic sticks in desired positions as indicated by control panel indicator lights while slower pin locking mechanisms may engage the pins. The invention provides a competent manner of prepositioning the pitch angle of the main rotor blades so as to allow use of relatively slow pin engagement means, without wear.

The present invention may be implemented in a variety of ways utilizing apparatus and techniques which are well within the skill of the art, in the light of the teachings which follow hereinafter. Similarly, the foregoing and various other objects, features and advantages of the present invention will become more apparent in the light of the following detailed description of an exemplary embodiment thereof, as illustrated in the accompanying drawing.

BEST MODE FOR CARRYING OUT THE INVENTION

Figure 1:
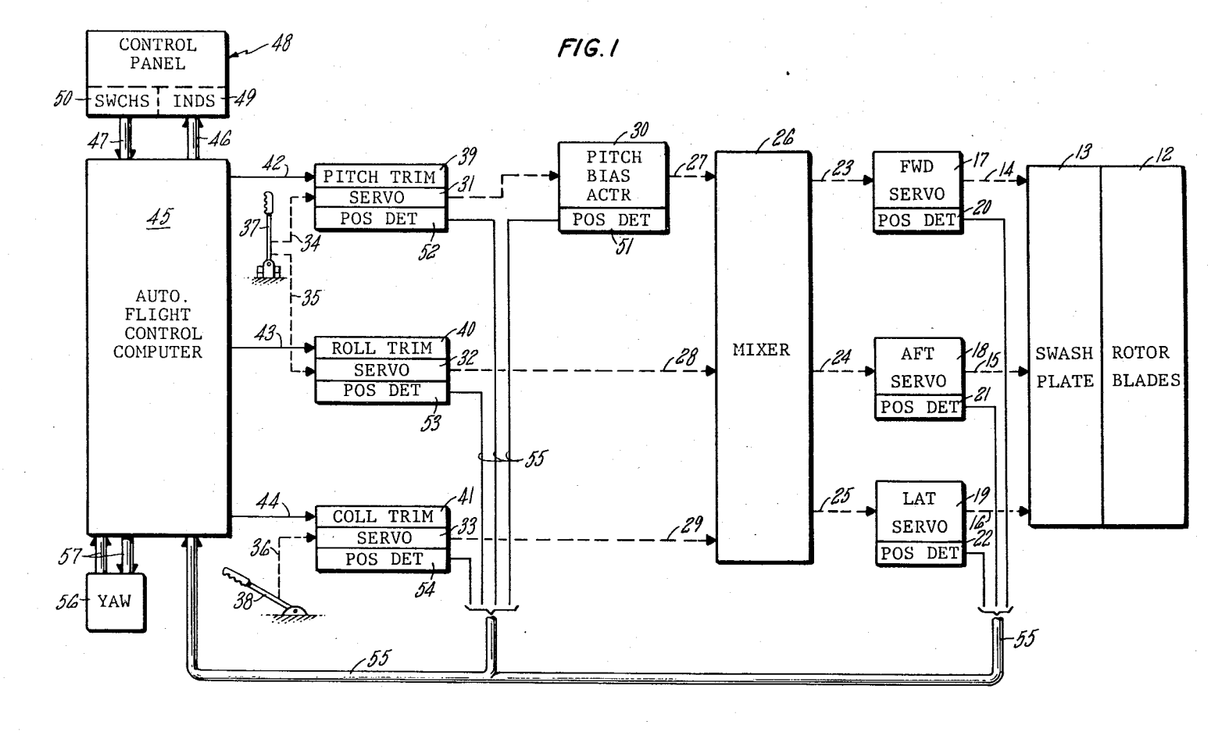
FIG. 1 is a simplified schematic block diagram of a helicopter blade pitch control system, employing an automatic flight control system computer, in which the present invention may be practiced.

Referring now to FIG. 1, a conventional helicopter with suitable apparatus to permit practice of the present invention includes main rotor blades 12, each of which is pivotable about a longitudinal axis in response to the position of a related push rod (not shown) which contacts a swash plate 13. When the main rotor is stationary, the degree of tilt and azimuthal position of tilt of the swash plate 13 in combination with vertical positioning of the swash plate determines a position for all of the push rods, thereby establishing a particular pitch angle for each of the blades. When the rotor blades 12 are rotating (the swash plate is always nonrotating), the push rods cause the pitch angle of each of the rotor blades to vary in a cyclic fashion as a consequence of rotation thereof relative to the swash plate 13.

The swash plate 13 is connected by mechanical linkage 14-16 to a plurality of servos 17-19 which are spaced about the swash plate and which can therefore control the positioning of the tilt axis, the degree of tilt and vertical position of the swash plate 13. Although spacing of the servos can vary from one case to the next, in the example herein it is assumed that the servos have the common configuration of a servo 17 being located forward of the rotor axis, a servo 18 being located aft of the rotor axis, and a servo 19 being located to the side of the rotor axis, they being referred to herein as forward, aft and lateral servos. In order to provide closed-loop feedback control, and otherwise to determine the pitch angle of all of the rotor blades (by determining the tilting of the swash plate 13), a plurality of position detectors 20-22 are provided for the respective servos. These position detectors may comprise potentiometers working from a regulated power supply, or linear differential voltage transformers, or any other suitable position detector as is known in the art.

Each of the servos 17-19 has a mechanical input member 23-25 from a mixer 26 which receives mechanical inputs 27-29 from each of three flight control axes: pitch, roll and collective (or lift). Depending upon the particular helicopter in which the present invention is practiced, these axes may have series actuators or they may not. For instance, the pitch axis input 27 to the mixer 26 is provided by a pitch bias actuator 30 which is in series with a servo 31, whereas the roll input 28 and collective input 29 are provided directly by related servos 32, 33. Or, the servos 31-33 may have direct series inputs for automatic flight control inputs, which can be accommodated in the same fashion as the series actuator 30 (described hereinafter). The servos 31-33 are typically boost servos which have mechanical inputs 34-36 from the two axes of a cyclic pitch stick 37 and from a collective pitch stick 38, respectively. Thus motion of one of the sticks moves the input to the servo, which hydraulically boosts the motion so that the desired activity is achieved with relatively low force applied to the sticks 37, 38.

The input to each of the servos 31-33 has a suitable electrically-controlled trim actuator 39-41 (either electric motor or hydraulic) which is responsive to a corresponding electric connection 42-44 from an automatic flight control computer 45. Provision of suitable trim command signals on the connections 42-44 by the computer 45 can cause the actuators 39-41 to control the pitch angle of the main rotor blades, thereby to adjust the angle when on the ground in order to enable locking prior to folding of the blades, or to control the flight profile of the aircraft when in flight. The automatic flight control computer may take the form of one of the computers described in a commonly owned, copending U.S. patent application of Murphy and Clelford, Ser. No. 938,583, filed on Aug. 31, 1978, now U.S. Pat. No. 4,270,168, and entitled SELECTIVE DISABLEMENT IN FAIL-OPERATIONAL, FAIL-SAFE MULTI-COMPUTER CONTROL SYSTEM. A computer of that type has output and input connections 46, 47 to and from a control panel 48 which may include indicators 49 and switches 50 to allow a pilot to interchange with the automatic flight control computer 45, and the capability of receiving inputs from inertial devices such as accelerometers and gyros, and various position indicators. As seen in FIG. 1, each of the position detectors 20-22 and similar position detectors 51-54 (relating to corresponding actuators and servos 30-33) may be connected into the automatic flight control computer 45 by a plurality of corresponding connections 55. The automatic flight control computer 45 may interconnect with other apparatus of the aircraft through multiplexed inputs and outputs which include analog conversion where necessary, all as is well known in the art and as described in the forementioned Murphy and Clelford patent.

Although not shown further in detail herein, the aircraft may also include a servo operated yaw channel 56 which is suitably connected to the automatic flight control computer by connections 57. This channel includes a pitch beam for controlling the pitch angle of the tail rotor blades, the pitch beam being positioned by a servo in a well known fashion. As is described briefly hereinafter, if the tail rotor is tilted, as is shown in U.S. Pat. No. 4,103,848, there may be coupling between the yaw axis and the pitch axis of the helicopter which requires some consideration in the blade folding operation. However, the coupling is not itself part of the present invention, is conventional and known and is therefore not described further herein.

The manner of carrying out the invention is described using as an example one of the automatic flight control computers disclosed in the aforementioned Murphy and Clelford patent. In that patent, two identical computers are disclosed as working together in a particular fashion; but the utilization of one of them to perform the intended functions (without the inter-computer functions) is readily achieved in the light of the teachings which follow hereinafter.

In the computer of the aforementioned patent, all of the flight control functions are performed during specific interrupts. To reach these programs, a general background routine, referred to as a background (BG) program is interrupted in a real time fashion, and each interruption causes a particular sequence of utility programs to be performed. The programs relate to generating automatic pilot commands, stability commands, bias commands, stick force commands and the like. The programs also provide many functions to determine the operational health of each computer and the health status communicated to it by the other computer, to determine the manner in which the two computers may handle the work load. In one of the routines reached in the aforementioned computer, functions to be performed when the aircraft is on the ground are reached in a third autopilot routine (AP 3) which is illustrated, as modified to practice blade folding, in FIG. 2 herein.

Figure 2:
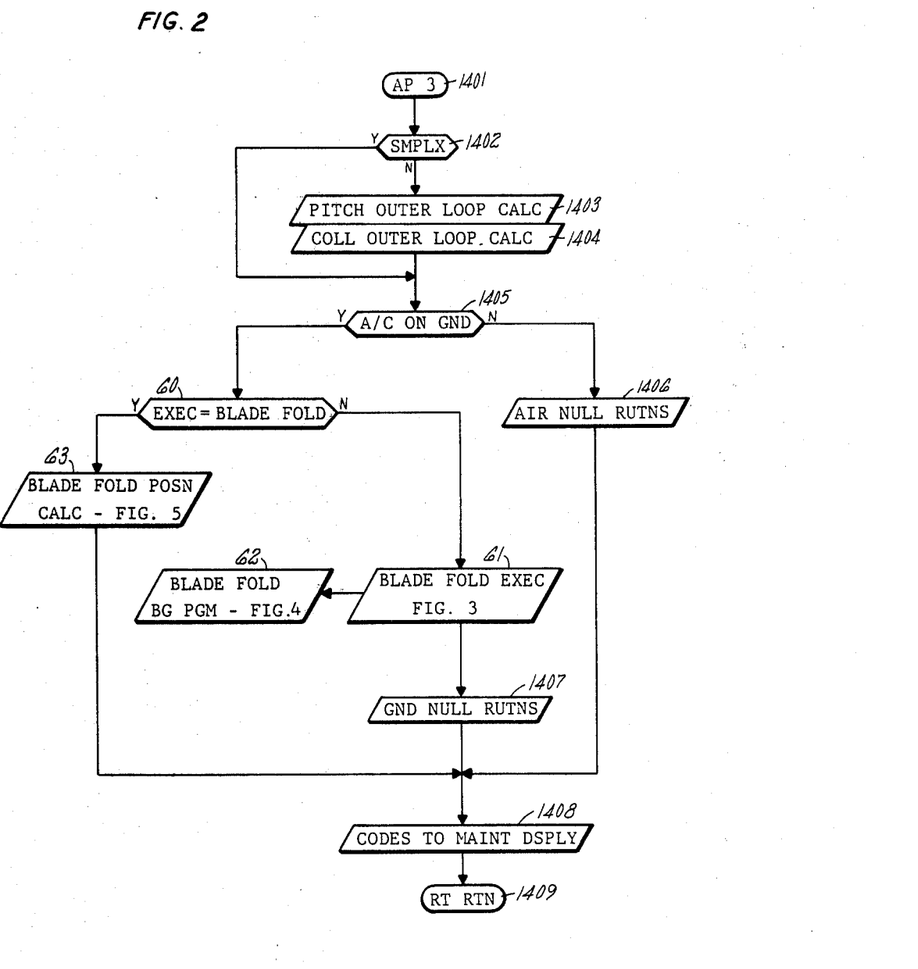
FIG. 2 is a simplified logic flowchart of a portion of an automatic flight control system program in which routines related to folding the blades may be reached when the aircraft is on the ground.

In FIG. 2 the four-digit reference numerals are the corresponding reference numerals found in FIG. 14 of the aforementioned Murphy and Clelford patent, the two-digit reference numerals are peculiar to the present disclosure. In FIG. 2, the third autopilot routine is reached through an entry point 1401 and a test 1402 determines if the particular computer is operating in a simplex mode or not. If it is not, then both computers are operating together and, in accordance with the twin computer reliability scheme of the aforementioned Murphy and Clelford patent, a pitch outer loop calculation 1403 and a collective outer loop calculation 1404 may be performed. But in the aforementioned patent, if only one computer is operating, it is not permitted to perform potentially disastrous functions such as operating the autopilot, so that the calculations 1403 and 1404 are bypassed by an affirmative result of test 1402. However, in an embodiment of the invention employing only a single computer, the test 1402 may be eliminated so that the pitch and collective outer loop calculation routines 1403 and 1404 will always be performed. Of course, use of a single computer requires other steps to determine the reliability of computer operation. In fact, the pitch outer loop calculation is a calculation which, with pitch output routines (of said patent), will provide the pitch trim command signal on the connection 42 (FIG. 1 herein). Similarly, the collective roll and yaw routines (including the collective outer loop calculation routine 1404 and other routines of said patent not shown herein) will provide the trim command signals on the connections 43, 44 and 57 (FIG. 1), in manners which are described hereinafter.

In FIG. 2, a test 1405 determines if the aircraft is on the ground. This tests a status indicator bit or word indicative of pressure on the helicopter wheels, the rotor being locked, and other factors. If test 1405 is negative, then the computer may perform air null routines 1406 which reestablish the nulls of various inertial sensors, and may perform other routines not related to the present invention. Then a step 1408 may transfer failure and fault codes to a maintenance display and the program will advance to other functions through a real time return point 1409, which is the manner of releasing the real time interrupt through which the third autopilot routine of FIG. 2 is reached, to return to a background program. All of the foregoing is described in far more detail in the context of an entire automatic flight control computer system in the aforementioned Murphy and Clelford patent.

In FIG. 2, if the aircraft is on the ground, as indicated by an affirmative result of test 1405, then a test 60 will determine if the executive control mode of the computer is set in a blade fold mode or not. In the present example, the blade fold executive mode is deemed to include the service executive mode (in contrast with a nonservice mode and a maintenance mode, as described in the aforementioned Murphy and Clelford patent). The nature and purpose of this, and the manner of establishing it are described with respect to FIGS. 3 and 4, hereinafter. In a first instance, test 60 will normally be negative so that the blade fold executive routine 61 (described with respect to FIG. 3 hereinafter) will be reached. Depending on how the routine 61 proceeds, the computer may have its executive mode switched into the blade fold mode, in which case the routine 61 will lead to a blade fold background program 62 by releasing the real time interrupt within which the third autopilot routine of FIG. 2 has been reached. Thereafter, the basic computer background program is the routine 62, and all of the normal computer functions are reached by interrupting the routine 62 (in contrast with interrupting a general background program, when the computer is in the service mode, in which self health tests such as a check sum test routine and a scratch pad test are performed, as illustrated in FIG. 4 of the aforementioned Murphy and Clelford patent). In FIG. 2, if the blade fold executive routine 61 does not determine that the blade folding operation is ready to proceed, it will lead to other routines, such as ground null routines 1407, the codes to maintenance display routine 1408 and then end the real time interrupt through the real time return point 1409. Eventually, the routine 61 may establish the executive in the blade fold mode in which case the test 60 will be affirmative, leading to a blade fold position calculation routine 63 which is described with respect to FIG. 5 hereinafter. This is the routine that actually provides the pitch, roll and collective trim commands necessary to position the pitch angle of the main rotor blades to enable them to be locked in anticipation of a folding operation.

Figure 3:
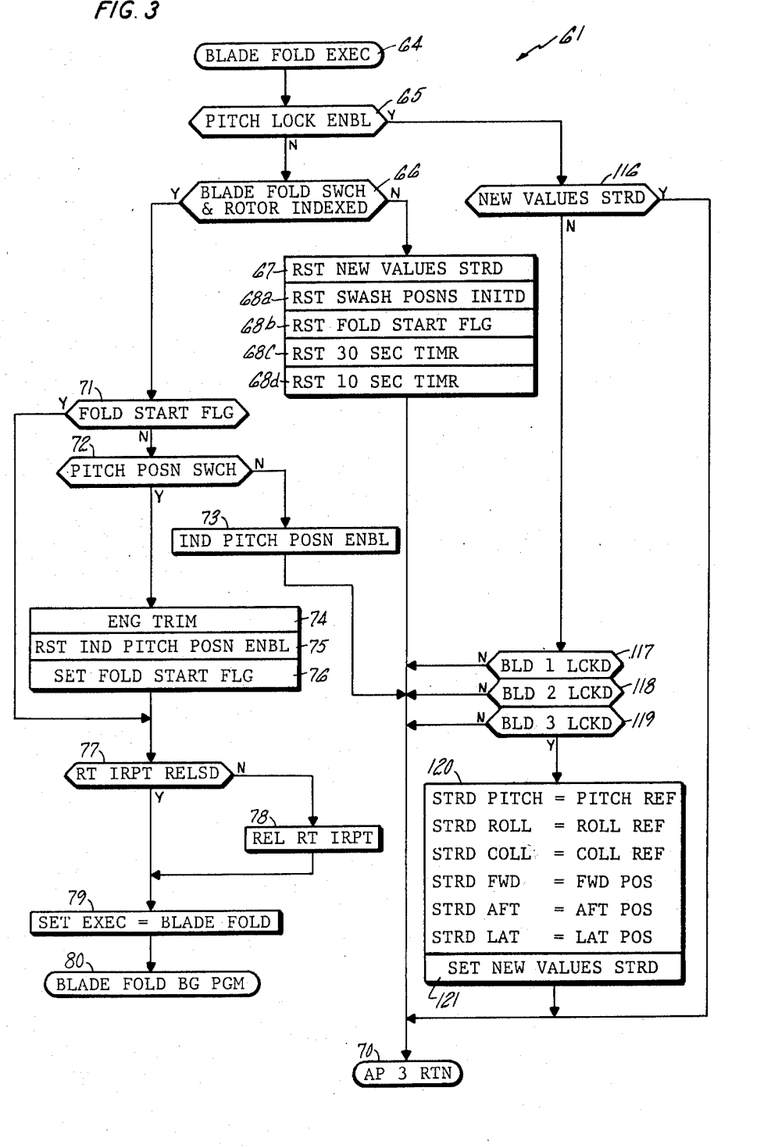
FIG. 3 is a simplified logic flowchart of an executive routine for controlling the operation of an automatic flight control system during blade fold operations.
Figure 4:
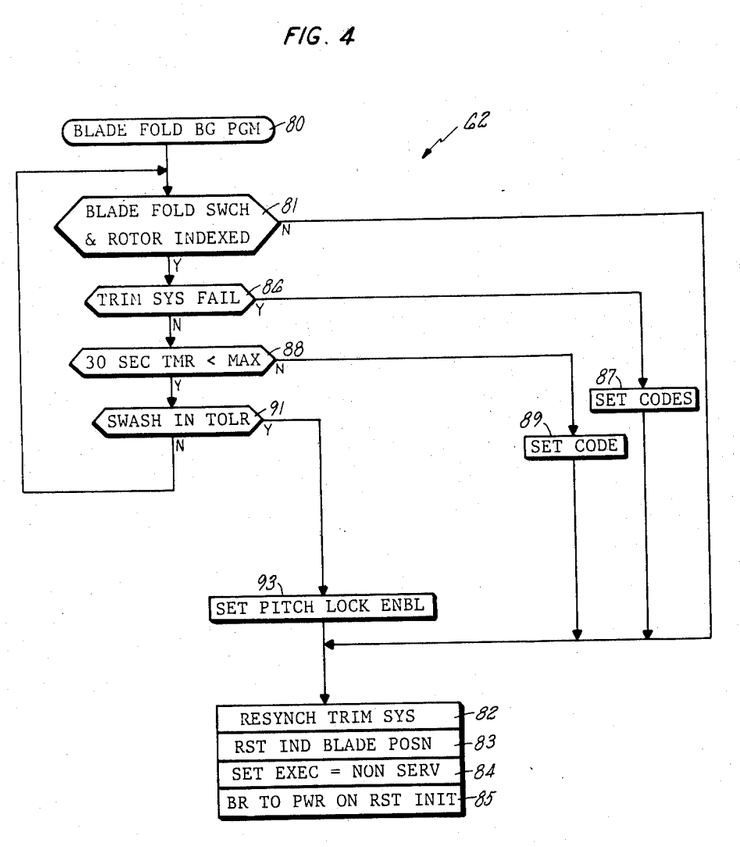
FIG. 4 is a simplified logic flowchart of a blade fold background program, from which computer interrupts may reach utility programs in practicing the present invention.

In FIG. 3, the blade fold executive routine 61 is reached through an entry point 64 and a first test 65 determines whether a pitch lock enable flag has been set yet or not. In a first pass through the routine of FIG. 3, the pitch lock enable flag normally will not have been set so that a negative result of test 65 will reach a test 66. This determines if the rotor has been indexed to the desired position for blade locking, as indicated by a suitable flag bit, and whether the pilot has activated a blade fold switch. Normally, the test 66 will be negative during a first pass through the routine of FIG. 3 so that a plurality of blade fold initiation steps will be reached, over and over, until the rotor is indexed to the correct position and the pilot has engaged the blade fold switch. The initiation steps include a step 67 to reset a new values stored flag, a step 68a to reset a swash positions initiated flag, a step 68b to reset a fold start flag (a local flag utilized only in the routine of FIG. 3 as described hereinafter), and steps 68c, 68d to reset a thirty second timer and a ten second timer. Then, the program will return to the third autopilot routine of FIG. 3 through a return point 70. The short pass through the blade fold executive routine 61 which merely provides the initialization steps 67–68d will be performed whenever the aircraft is on the ground unless and until the pilot decides to initiate a folding operation by first indexing the rotor to the correct azimuthal position for blade folding, and thereafter performing the very first step, which is to engage the blade fold switch so that test 66 can be affirmative.

In FIG. 3, when test 66 is affirmative, a test 71 determines whether or not a local fold start flag has been set. This flag simply ensures that certain functions are performed once and only once in each blade fold operation. Since the fold start flag is reset in test 67 during pre-folding initialization, the initial pass through step 71 is always negative. This causes a test 72 to determine whether or not the pilot has engaged a pitch position switch, which is the second stage of blade folding controlled by the pilot. If the switch has not been engaged, a negative result of test 72 will reach a step 73 which provides a signal that causes the indicators 49 (FIG. 1) to indicate pitch position enable so that the pilot knows that the sequence has reached the stage where he should engage the pitch position switch if he wishes to continue with the blade folding operation. In such case, the step 73 is the only step performed in the blade fold executive routine 61 during the current cycle, and the third autopilot routine is returned to through the return point 70.

In a subsequent pass through the blade fold executive routine 61, the pilot will have eventually engaged the pitch position switch so that step 72 is affirmative. In such case, a step 74 causes the trim system to be engaged (that is, so that the computer can cooperate with the trim valves 39-41, FIG. 1, so as to adjust the pitch position of the blades for the folding operation). Then a step 75 resets the indicate pitch position enable flag which was set in step 73 so the pilot knows that his engagement of the pitch position switch has been recognized. And a step 76 will set the fold start flag so that, in subsequent passes through the blade fold executive routine 61, test 71 will be affirmative, therefore bypassing the steps 73-76.

In FIG. 3, once the fold start flag has been set, a test 77 determines if the real time interrupt (the interruption of the program which causes reaching the third autopilot routine of FIG. 2) has been released; if not, a step 78 causes releasing of the real time interrupt. This requires simply enabling all interrupts of the same or lower priority as that of the real time interrupts; and, the program will simply advance in a fashion that does not lead to an interrupt return (so that the return to the normal background program which is in effect when the executive mode of the computer is in the service mode will not be reached). Then the executive of the computer is set into the blade fold mode by a step 79, and the blade fold background program is reached through a transfer point 80.

In FIG. 4, the blade fold background program 62, reached through the transfer point 80, is basically a closed-loop that can only be exited by taking the executive out of the blade fold mode, essentially ending the blade fold operation. This may be done as a consequence of changes in operation or failures which may occur, or as a consequence of having satisfactorily completed the blade pitch positioning function of a blade folding operation (which is the only function that the automatic flight control computer 45, FIG. 1, performs during blade folding). Specifically, the blade fold background program 62 begins with a test 81 to determine if the blade folding operation is still in progress, as indicated by the blade fold switch still being engaged and the rotor still being indexed. This is the same as test 66 in FIG. 3. In the event that the rotor is inadvertently moved from its folding index position, or if the pilot changes his mind and disengages the blade fold switch, then a negative result from test 81 will cause the blade fold background program to advance to a step 82 to resynchronize the trim system to desired trim positions, thereby to eliminate any blade positioning which may have occurred as a result of the blade positioning routines being performed for several cycles before the pilot changes his mind. A step 83 causes the blade fold indication to be reset, a step 84 sets the executive mode into the nonservice mode and a step 85 causes the program to branch to an initialization portion of the program at or close to that which occurs for a power on reset (which may be somewhere in the regime of steps 400–405 in FIG. 4 of the aforementioned Murphy and Clelford patent), in any fashion which is suitable depending upon the particular computer and implementation of the present invention. The steps 82-85 effectively shut down the blade fold positioning operation and cause the automatic flight control system to reinitiate for normal flight modes.

In FIG. 4, a second test in the blade fold background program 62 is test 86 which determines if any of the tests which may be performed on the trim system have failed, causing a trim system failure flag to be set. If there has been failure of the trim system, the test 86 will reach a step 87 to set appropriate maintenance codes, which may depend upon the particular nature of the failure, and cause the blade fold mode to be ended by steps 82-85 as described hereinbefore. Another test 88 will determine if blade fold positioning has been in process for less than thirty seconds. If not, the positioning process has taken too long and therefore cannot be completed because of some condition of the helicopter external of the computer or some inability of the computer to provide correct positions. In such case, a negative result of test 88 will reach a step 89 that sets an appropriate failure code, and the blade fold operation is terminated by steps 82-85 as described hereinbefore.

In FIG. 4, the normal way of exiting the blade fold background program 62 is by means of a test 91 which tests a flag (generated as described hereinafter) which determines that the swash plate has been positioned within tolerance and therefore the blade pitch angle positioning for a blade fold operation has been successfully completed. An affirmative result from step 91 leads to a step 93 which sets a pitch lock enable flag; this is a flag that indicates successful completion of blade pitch positioning, enabling pitch lock motors to drive pitch lock pins so as to retain the established blade pitch angle during the folding operation. Then, the blade fold positioning operation of the computer is terminated by steps 82-85 as described hereinbefore.

Once the blade fold background program 62 of FIG. 4 has been entered by the transfer point 80, it will generally continuously cycle through the tests 81, 86, 88 and 91, returning to the test 81, and so forth. This is a locked program loop which can be exited only as a consequence of test results as described immediately hereinbefore, or by means of program interrupts. The program interrupts are real time interrupts that causes the computer routine to jump out of the blade fold background program and to perform all of the normal utility programs, including the third autopilot routine of FIG. 2 and the routines reached therein. Thus while the automatic flight control system computer 45 is in fact being utilized to provide commands on the connections 42–44 (FIG. 1) so as to drive the swash plate for correct blade pitch angles to permit folding of the blades, the utility programs, and particularly those related to blade folding, are all reachable by means of the normal real time interrupts. When these programs have been completed in each cycle, the computer automatically branches back to the blade fold background program 62 by means of interrupt release, in the normal fashion. As is apparent from a full understanding of all of the routines described hereinbefore and hereinafter, the only function of the blade fold background program is to monitor the desirability of retaining the computer executive in the blade fold mode. And, this is utilized in the third autopilot routine of FIG. 2 simply to either cause passage through the blade fold executive program 61 or passage through the blade fold position calculation routine 63, as described hereinafter. Of course, other programming arrangements could be selected to provide similar functions, with or without utilizing a background program. This in turn may depend somewhat upon the particular automatic flight control system computer utilized to implement the present invention, in accordance with the skill of the art.

Figure 5:
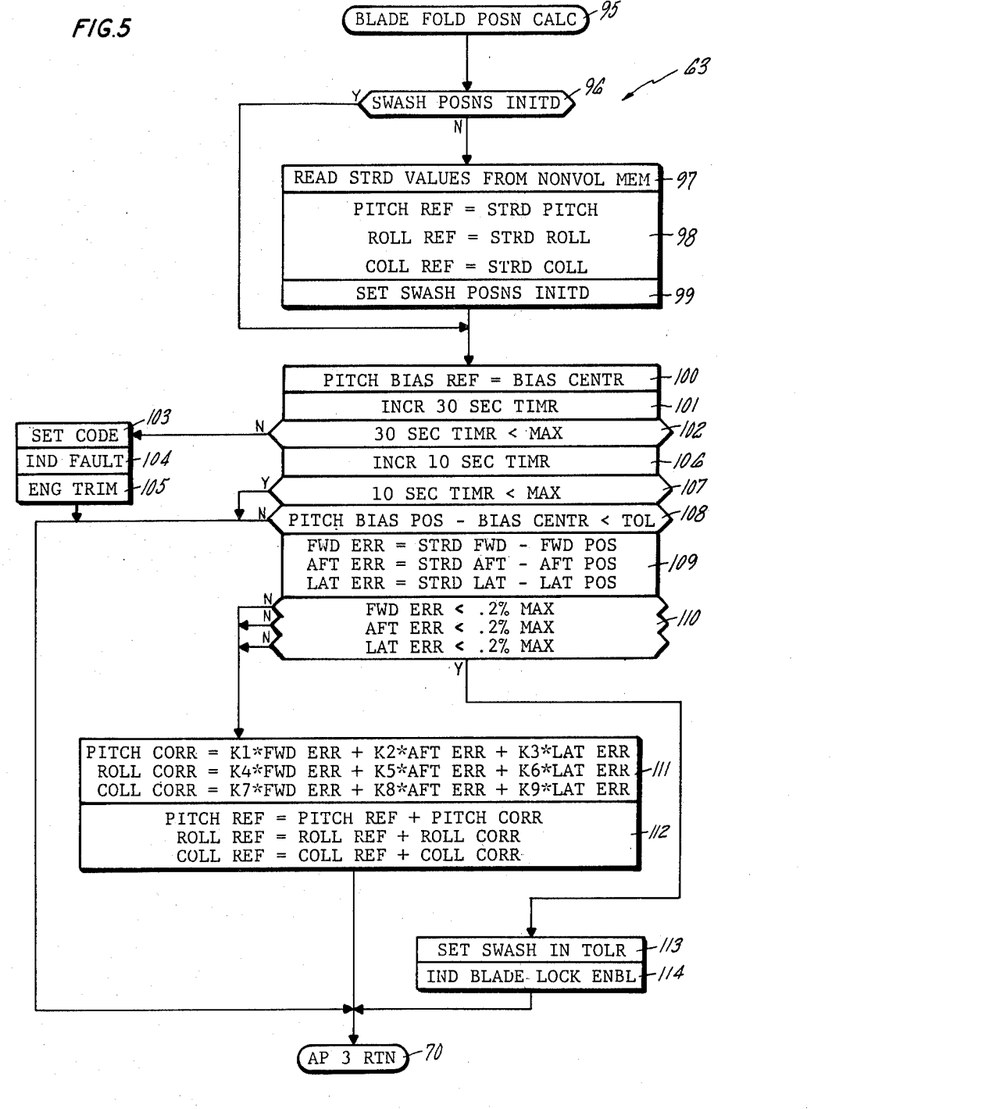
FIG. 5 is a simplified logic flowchart of a blade fold position calculation routine.

Once the executive program has been set into the blade fold mode by step 79 within the blade fold executive program 61 of FIG. 3, each pass through the third autopilot routine of FIG. 2 will cause the test 60 to be affirmative so that the blade fold position calculation routine 63 will be reached, through an entry point 95 in FIG. 5. A first test 96 determines if position values have been initiated, by interrogation of the flag reset in step 68a, FIG. 3. If not, a step 97 causes the stored values of pitch, roll and collective references and the stored values of desired swash plate servo positions to be read into the working portion of the computer from nonvolatile read/write memory. These are provided in the nonvolatile read/write memory at the conclusion of a preceding blade folding operation as is described with respect to FIG. 3, hereinafter.

Then, a series of steps 98 cause the pitch reference, roll reference and collective reference values, to be utilized in generating trim commands on the connections 42-44 (FIG. 1), to be respectively set equal to the stored pitch, stored roll and stored collective values which were determined in the previous blade operation. Then a step 99 sets the position initiated flag which was tested in step 96 so that in subsequent passes through the blade fold position calculation routine 63, the steps 97-99 will be bypassed.

If any implementation of the invention includes a series actuator, such as the pitch bias actuator 30, FIG. 1, it may be desirable to force such actuator to a known position so as to achieve repeatability of swash plate positioning, without any adverse effect by the series actuator. Therefore, a step 100 may, in each pass through the blade fold position calculation routine 63, cause the pitch bias reference value to be equal to the center position of the pitch bias actuator 30 (FIG. 1). This provides a simple method of utilizing the regular pitch bias command generation (such as that shown in the aforementioned Murphy and Clelford patent) to center the series actuator in an open loop fashion. Then a step 101 will increment the thirty second timer which was previously reset in step 68c of FIG. 3. A test 102 determines if the thirty second timer has been incremented to less than its maximum value; if not, this indicates that the blade fold position calculation has been in process over many cycles spanning thirty seconds in time, which is an indication that something is wrong. Therefore a negative result of test 102 will lead to a step 103 which sets a failure code, a step 104 which provides a fault indication to the pilot, and a step 105 which forces the trim system to be engaged (so that it can be resynchronized in the fashion described with respect to FIG. 4 hereinafter as the necessary consequence of an excessive time terminating the blade fold position operation of the computer). In such case, the program will revert to the third autopilot routine of FIG. 2 through the transfer point 70.

In a normal case, the thirty second timer will not have timed out, so the test 102 will be affirmative leading to a step 106 which increments a ten second timer. Then a test 107 determines if the ten second timer has been incremented in a sufficient number of cycles so as to have reached its maximum count or not. If the setting of the ten second timer is less than its maximum, an affirmative result of test 107 causes the program to advance directly back to the third autopilot routine by means of the return point 70. This provides ten seconds within which successive computer program cycles can utilize the reference positions established in steps 98 to cause trim commands to be generated and utilized, in a fashion described with respect to FIG. 1 hereinbefore, so as to position the swash plate 13 to desired reference values. There is no point in determining whether or not these reference positions have been reached until there has been sufficient time for them to be reached. Since the blade pitch positioning system has a response characteristic of 10% of authority per second, a time frame of ten seconds will ensure that the rotor blades could be rotated from any blade pitch angle to a desired blade pitch angle within the ten second time frame, since 100% of authority would be encompassed. Therefore, when the ten second timer has been incremented sufficiently to reach its maximum count, test 107 will be negative causing a test 108 to determine if the series bias acutator, such as a pitch bias actuator, has reached a position equal to a stored center position. If not, a negative result of test 108 will cause the third autopilot program to be resumed through the return point 70. But assuming that the series actuator can be suitably positioned within the ten second time frame or shortly thereafter, test 108 will eventually be affirmative leading to steps 109, which determine the error between the desired swash plate servo positions and the stored swash plate servo positions which are believed to be correct to enable blade locking to occur. Then a series of tests 110 determine if all of the errors in swash plate servo position are less than 0.2% of the maximum range of positions. If any of them is not within 0.2%, a negative result of one of the tests 110 will cause correction of the position by means of steps 111 and 112. In steps 111, pitch, roll and collective corrections relating to the current error in the individual swash plate servos (forward, aft and lateral) are generated by a matrix which is inverse to the function of the mixer 26 (FIG. 1). In other words, the constants K1-K9 used in steps 111 to cause pitch, roll and collective correction factors to be generated, are those that indicate adjustments to the pitch, roll and collective commands which will result in suitable adjustments to the forward, aft and lateral swash plate servo positions taking into account the effect that the mixer 26 (FIG. 1) has in transposing the aircraft axis commands to the swash plate servo commands. This is referred to herein as an inverse mixer matrix. Then, steps 112 cause the pitch, roll and collective reference values, which were established initially in steps 98, and which control the commands provided to the pitch, roll and collective trim valves 39-41, to be updated by addition thereto of the correction factors generated in steps 111. Then the program can advance back to the third autopilot program of FIG. 2 by means of the return point 70.

Eventually, after several passes through the blade fold position calculation routine 63 of FIG. 5, if the factors being used and all of the equipment operations are proper, the forward, aft and lateral swash plate servos will be positioned within 0.2% of the previously stored values, indicating that blade locking can take place. Therefore, the tests 110 will be affirmative causing a step 113 to set a flag indicative of the fact that the swash plate has been positioned within tolerance; and, a step 114 will cause an indication that blade lock is enabled, so that the pilot can operate the blade lock pin insertion motors or other means. And then, the third autopilot routine is returned to by means of the return point 70.

In FIG. 2, completion of each pass through the blade fold position calculation routine 63 will lead to the codes to maintenance display routine 1408 and to the real time interrupt return 1409. This causes release of the real time interrupt so that the computer reverts to the blade fold background program 62 as illustrated in FIG. 4. Because the basic loop of the blade fold background program routine consists only of four tests, it is well assured that at computer speeds normally encountered, all of these four tests will be made many times before the next real time interrupt causes the program to revert to the routines caused by interruptions. Thus it is well assured that test 91 will be made, and since the swash in tolerance flag was set in step 113, as described hereinbefore with respect to FIG. 5, this test will be affirmative. Therefore, step 93 will set the pitch lock enable flag (which is a significant advancement in the routine as described hereinafter) and steps 82–85 will cause the computer to pass out of the blade fold background program and refer to the nonservice mode for reinitialization purposes. Eventually, the third autopilot routine of FIG. 1 will again be reached during one of the real time interruptions, and test 60 will not be negative so that the blade fold executive routine 61 (FIG. 3) will again be reached. In this case, test 65 in FIG. 3 will be affirmative since the pitch lock enable flag has been set in step 93 of FIG. 4. An affirmative result of test 65 will reach a test 116 which determines if a one-time local flag has been set, indicative of whether or not the new values have been stored as yet. Initially, test 116 will be negative so that a plurality of tests 117–119 may be reached to determine if all of the blades have been locked in pitch angle. If any of the tests 117–119 is negative, the computer will revert to the third autopilot routine through the return point 70. In subsequent passes through the third autopilot routine (FIG. 2) which lead to the blade fold executive routine 61 (FIG. 3), eventually all of the blades should be locked so that all of the tests 117–119 will be affirmative. This will lead to a series of steps 120 which cause the present values of pitch, roll and collective trim reference to be stored for use in subsequent blade folding operations and cause the final positioning of the forward, aft and lateral swash plate servos to be stored for use in a subsequent blade fold operation. These are the values which are accessed by step 97 in the blade fold position calculation routine 63 (FIG. 5). Once the steps 120 are completed, the new values stored flag is set in a step 121. Therefore, in any subsequent passes through the blade fold executive routine 61 in FIG. 3, when the pitch lock enable flag is still set, step 116 will be affirmative, so that no functions are performed by the blade fold executive program.

Thus there has been described a system which positions the swash plate servos by means of autopilot trim commands so that the blade pitch angle of helicopter blades can be locked before folding. When the blades are locked, the autopilot trim references used to command the swash plate servos are stored for use in a subsequent blade folding operation, along with the final swash plate servo positions at which the blades were ultimately locked.

Although the invention has been shown and described with respect to exemplary embodiments thereof, it should be understood by those killed in the art that the foregoing and various other changes, omissions and additions may be made therein and thereto, without departing from the spirit and the scope of the invention.

We claim:

1. A helicopter having foldable main rotor blades, the pitch angles of which are positionable by push rods in dependence upon the vertical position and tilt of a swash plate cooperating with said push rods, said blades being lockable at specific pitch angles as a prerequisite to folding, said swash plate being positioned by a plurality of servos, each of said servos being separately operable in response to corresponding outputs of a mixer, the mixer in turn receiving inputs from pitch, roll and collective channels, each of said channels including an electrically operated trim actuator for providing a corresponding input to said mixer in response to a related trim command signal from signal processing means, characterized by:
    a position detector for each of said servos, each position detector providing a servo position signal indicative of the position of a corresponding one of said servos; and
    said signal processing means comprising means for storing a plurality of pitch, roll and collective reference signals related to predetermined positions of said servos at which rotor blade pitch angle is correct for locking, and for providing trim command signals to said pitch, roll and collective trim actuators in respective response to said pitch, roll and collective reference signals, thereby to cause said mixer to drive said servos substantially to said predetermined positions as indicated by corresponding ones of said servo position signals.

2. A helicopter according to claim 1 further characterized by said signal processing means comprising means for storing a plurality of desired position signals, each indicative of a corresponding one of said predetermined positions of said servos, for generating a plurality of difference signals, each difference signal indicative of the difference between one of said desired position signals and a corresponding one of said servo position signals, for generating a plurality of correction signals, each indicative of a change in a corresponding one of said pitch, roll and collective reference signals required in order to provide trim commands to said trim actuators to reduce said difference signals to a zero value, and for providing each of said trim command signals in response to the summation of the corresponding one of said correction signals and the corresponding one of said reference signals.

3. A helicopter according to claim 2 further characterized by:
    means providing a lock signal indicative of the fact that said blades are locked in pitch angle; and
    said signal processing means comprising means responsive to said lock signal for storing said summations of said correction signals and said reference signals as well as said servo position signals for utilization as said stored reference and desired position signals in a subsequent blade folding operation.

* * * * *